United States Patent [19]

Zemelman et al.

[11] 4,347,707
[45] Sep. 7, 1982

[54] GASIFIED ICE PRODUCT AND PROCESS HAVING IMPROVED STORAGE STABILITY

[75] Inventors: Valery B. Zemelman, Wilton, Conn.; Fredric Kleiner, New City; Michael J. Kuchman, Hopewell Junction, both of N.Y.

[73] Assignee: General Foods Corporation, White Plains, N.Y.

[21] Appl. No.: 249,543

[22] Filed: Mar. 31, 1981

[51] Int. Cl.³ ............................................. F25C 1/18
[52] U.S. Cl. ............................................. 62/69; 62/1; 62/48
[58] Field of Search .......................... 62/1, 48, 69, 70

[56] References Cited
U.S. PATENT DOCUMENTS

| | | | |
|---|---|---|---|
| 2,975,603 | 3/1961 | Barnes et al. | 62/1 |
| 3,086,370 | 4/1963 | Barnes et al. | 62/1 |
| 3,217,503 | 11/1965 | Mitchell et al. | 62/48 |
| 3,220,204 | 11/1965 | Adler et al. | 62/70 |
| 3,255,600 | 6/1966 | Mitchell et al. | 62/69 |
| 3,333,969 | 8/1967 | Mitchell et al. | 99/192 |
| 4,285,977 | 8/1981 | Yezek et al. | 62/48 X |

Primary Examiner—William E. Tapolcai
Attorney, Agent, or Firm—Joyce P. Hill; Thomas R. Savoie; Daniel J. Donovan

[57] ABSTRACT

The present invention provides a gasified ice product characterized by a high gas content, prolonged storage stability suitable for commercial distribution in its frozen state, and a vigorous, uniform release of gas when placed in aqueous liquid. The disclosed process maintains a high contact pressure between the gas and aqueous liquid and cools after hydrate formation under conditions of temperature and pressure which are controlled to prevent decomposition of hydrate or liquefaction of gas.

11 Claims, 2 Drawing Figures

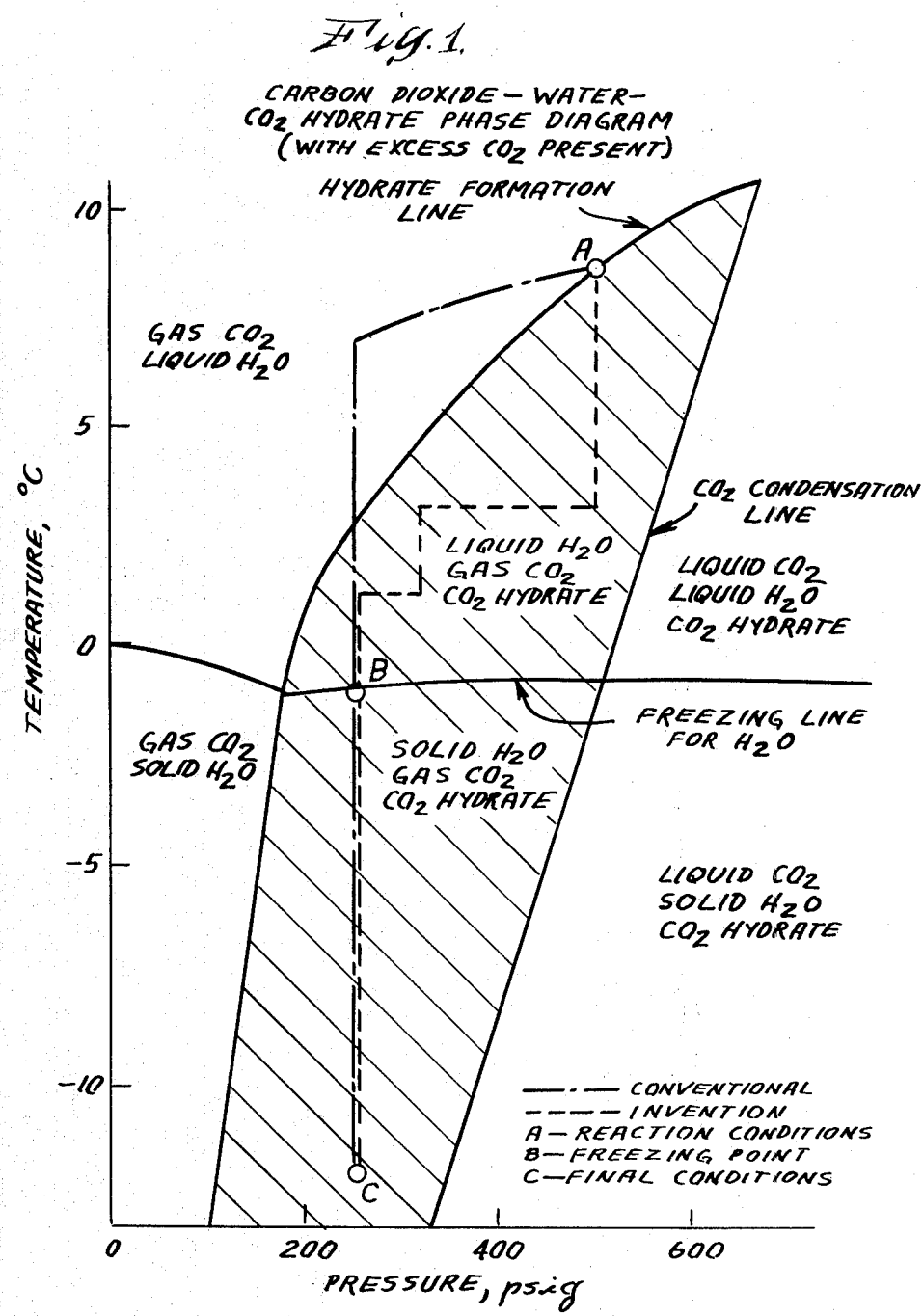

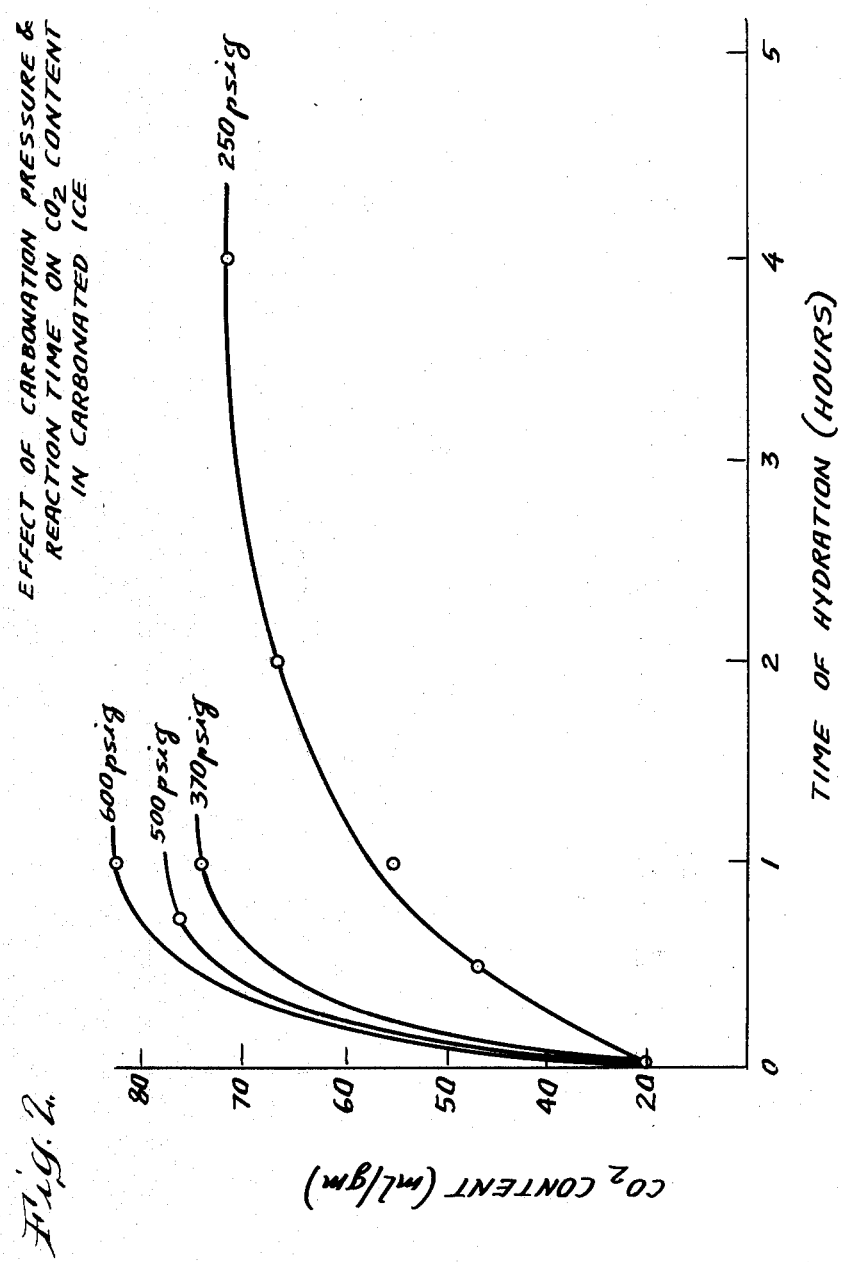

//4,347,707

GASIFIED ICE PRODUCT AND PROCESS HAVING IMPROVED STORAGE STABILITY

DESCRIPTION

Technical Field

The present invention relates to gasified ice products and their preparation; and particularly, to improvements which provide products of this type characterized by high gas contents, prolonged storage stabilities suitable for commercial distribution in the frozen state, and vigorous, uniform release of said gas when placed in an aqueous liquid.

Gasified ice products are known which, due to the binding of the gas within a chemical gas hydrate complex, have enabled delivery of high volumes of gas from relatively small volumes of ice. These products have shown potential for storage and transport of gases of many types. Typically, the gas will be carbon dioxide and the product will be employed to carbonate an aqueous liquid in the simplified home preparation of carbonated beverages. For the greatest economy and convenience, it is desirable to incorporate high levels of gas. Unfortunately, products having desirably high gas contents have heretofore had a reported shelf-life in frozen storage of about 33 days and have released gas unevenly.

In its simplest form, the process for preparing gasified ice products has comprised contacting aqueous liquid with gas under high pressure for a sufficient period of time to form a desired level of gas hydrate, and then cooling to freeze the remaining unreacted liquid and entrap gas hydrate. The usual result of these high pressure processes was the entrainment of large pockets of free, conditionally-stable, hydrate-forming gas in either the gaseous or liquid state. Large pockets of entrained gas can fracture the frozen liquid that encapsulates it, resulting in uneven and sometimes explosive gas release while in frozen storage at atmospheric pressure and when the ice product is placed in water for use. Gas released while in frozen storage can greatly diminish the ability of the gasified ice product to deliver the desired amount of gas at the point of liberation under atmospheric pressure. It can be hazardous where the gasified ice product contains a chlorine gas hydrate and chlorine gas is released in frozen storage or in an explosive manner when placed in water.

Background Art

Barnes et al in U.S. Pat. Nos. 2,975,603; 3,086,370; and 3,217,503 disclosed a process for producing carbonated ice characterized by a long storage life reported as being 33 days. It is also taught that the carbonated ice product has the ability to form a superior effervescent beverage upon mixture with aqueous liquid. According to one aspect of the disclosure, the carbonated ice was prepared by subjecting aqueous liquid to a carbon dioxide pressure of at least about 200 psig and preferably less than 600 psig; maintaining the aqueous liquid and the carbon dioxide in contact for a time sufficient to permit absorption in the liquid of carbon dioxide in bound form and formation of carbonated ice containing at least about 25-27.5 milliliters of carbon dioxide per gram of ice; and withdrawing the carbonated ice.

Barnes et al disclosed that the upper limit of the range of pressure which could be employed for all practical purposes was 600 psig. More specifically, they stated, that it was found that the product carbonated ice was more stable when the pressure of the carbon dioxide was correlated with the temperature of the water-carbon dioxide mixture so that the pressure was less than the liquid-vapor equilibrium pressure of the carbon dioxide at that temperature. It is disclosed further that where pressures above 400 psig are employed during contact, it is preferred that the resulting product be degassed or stabilized at atmospheric pressure for about 24 hours at −10° C. The patentees indicate that during this period, any carbon dioxide which may loosely be held within the product is volatilized. Further, they indicate that liquid carbon dioxide which may be within the mass is generally volatilized and passed off from the solid product during the degassing period.

According to the specific example disclosed, water was contacted with carbon dioxide at a pressure of 400 psig. The contact vessel was placed within a constant temperature bath maintained at 0° C. during the period of contact. After 75 minutes, the vessel was removed from the bath, cooled, depressurized and opened. The contents were removed and the solid ice was stored for 24 hours at −10° C. to effect degasification. Testing of the degasified product revealed that it had a carbon dioxide content of 75 volumes carbon dioxide per gram of ice and no loss of carbon dioxide was apparent during 33 days. Barnes et al indicate only that a degassing period readily liberates any gas which is not securely locked within the ice matrix and report that the resulting degassed product has a shelf-life which is at least 30 days, and usually substantially longer. The specification does not further define how much longer the product remains stable in frozen storage, it has been our experience with products prepared in accordance with this general procedure at high gas contents, that the product loses significant gas content before it can be commercially distributed and consumed. The product also pops and cracks when placed in water and often splashes water from the container.

U.S. Pat. No. 3,086,370 discloses that in addition to carbon dioxide, gasified ice products containing other gases such as nitrous oxide, certain sulfur-containing gases, certain chlorine-containing gases, various inert gases and carbon monoxide could be formed. Because this patent was based upon a continuation-in-part application of U.S. Pat. No. 2,975,603 (Barnes et al, supra) much of the same disclosure regarding pressures and the natural evolution of gas of the solid ice product at ambient pressures is carried forward. Specifically, it is indicated that degassing is necessary to prevent danger of explosion or product deterioration due to presence of any gas which is not securely locked within the ice matrix.

A similar disclosure in this regard is found in U.S. Pat. No. 3,217,503 to Mitchell et al which again is a continuation-in-part of the application which resulted in the U.S. Pat. No. 2,975,603 to Barnes et al. This patent however describes in more detail the method for handling and transporting gasified ice to a desired point of liberation under atmospheric pressure while maintaining it at a temperature below its melting point.

Adler et al in U.S. Pat. No. 3,220,204, state that while the prior art procedures of Barnes et al produce products which will retain a significantly high level of carbonation during frozen storage, they have not specified the length of time the gasified ice product retains high levels of carbon dioxide. Instead, Adler et al emphasize that the products had a tendency to explode or pop (i.e., break apart and disintegrate with loud noise) at an unpredictable point of time during its dissolution. They indicate that when the Barnes et al carbonated ice products are added to water or milk, they frequently explode in the glass. Their solution to the problem entailed providing a high liquid surface to gas contact during the preparation of the hydrate. To achieve this, they employed a thin film of water which was subjected to carbon dioxide gas at a pressure and temperature above the eutectic point of the water and at a temperature low enough to form a hydrate. Thereafter the hydrate was converted to a stable form by freezing the resulting mixture of water and hydrate at a temperature below −3° C. rather than degassing at atmospheric pressure for about 24 hours at −10° C. While they retain the disclosure of high pressure levels for contact, the specific examples do not exceed 250 psig, the final carbon dioxide contents do not exceed 50 milliliters per gram of product. Shelf-life in frozen storage is not discussed.

In U.S. Pat. No. 3,255,600 to Mitchell et al there is disclosed a process for forming carbonated ice wherein liquid carbon dioxide and liquid water are mixed under controlled conditions to form the carbonated ice product. The inventors indicate that they discovered that liquid carbon dioxide results in a more rapid formation of the product while permitting more accurate control of the operating conditions. After a degassing period to liberate carbon dioxide that is not securely entrapped, the product is reported to have a shelf-life of at least 30 days. It has been our experience, however, that the use of liquid carbon dioxide requires the use of great quantities of energy and produces a product which loses significant gas content before it can be commercially distributed and has the popping and cracking problems associated with the earlier prior art.

Throughout this evolution of gasified ice products, Mitchell et al disclose in U.S. Pat. No. 3,333,969, that the problem of uneven release of carbon dioxide had persisted. Mitchell et al did not specifically discuss concern for the length of product shelf-life under frozen storage conditions but focused on a method for subdividing carbonated ice into discrete particles while maintaining the temperature of the ice below 0° C., and then compacting the discrete particles to form them into an adhered mass or briquette to eliminate the explosive release of carbon dioxide during carbonation. Example III shows that briquettes prepared according to this process had an average carbon dioxide content of 38 milliliters per gram of ice and, after storage for two weeks, the product retained about 95% of its original carbon dioxide content. A product having a two-week shelf-life in frozen storage would be totally unacceptable in the commercial marketing of frozen carbonated ice which must be distributed and retained by the consumer until desired for beverage carbonation.

It is apparent from the foregoing discussion of the prior art that the problem of providing a gasified ice product having a shelf-life suitable for commercial distribution in the frozen state had not been addressed. The major, and somewhat related, concern has been the problem of uneven and sometimes explosive release of gas from the gasified ice products. Thus, there is a present need for an improved nonexplosive, gasified ice product having prolonged storage stability suitable for commercial distribution in the frozen state and an improved process for preparing it.

Disclosure of Invention

In accordance with the present invention, we provide an improved process for preparing a gasified ice product characterized by a high gas content, prolonged storage stability suitable for commercial distribution in its frozen state, and vigorous, uniform effervescence when placed in water and quiet, nonpopping, nonexplosive melting in air. Also provided is the product of this process, and as a preferred form of product, a carbonated ice containing greater than 75 milliliters of carbon dioxide per gram of product. In its broad aspects, the process comprises:

contacting aqueous liquid with a conditionally-stable-hydrate-forming gas under conditions of temperature and pressure capable of forming a chemical hydrate complex of the gas, the contacting temperature and pressure being on or below the hydrate formation line at a temperature above the freezing temperature of the aqueous liquid; maintaining said contact for a period of time effective to form gas hydrate suspended in the aqueous liquid; reducing the temperature of the aqueous liquid containing said gas hydrate complex while lowering the pressure to maintain the pressure below that which is represented by the gas condensation line at the existing temperature and above that which is represented by the hydrate formation line. The final temperature of the aqueous liquid containing the gas hydrate complex is below the freezing temperature of the aqueous liquid and via this process the suspended gas hydrate complex is entrapped in the aqueous liquid in a frozen state.

The surprising and unexpected finding that is the essence of this invention is that by forming the gas hydrate complex and freezing the resulting hydrate/aqueous liquid mixture under conditions of temperature and pressure which are controlled to prevent decomposition of hydrate or liquefaction of gas, a nonexplosive gasified product is obtained, which is substantially free of large pockets of entrained gas (i.e., nonexplosive) and which more importantly has storage stability suitable for commercial distribution in its frozen state.

In addition to the product of this process, the invention provides a preferred carbonated ice product containing greater than 75 milliliters of carbon dioxide per gram which is characterized by vigorous, uniform effervescence when placed in aqueous liquid, which comprises: a solid suspension of stable carbon dioxide hydrate within a continuous matrix of solid ice, the ice being substantially free of large pockets of entrained carbon dioxide in either the free liquid or free gaseous states.

As used in this application, "hydrate formation line" represents the conditions of temperature and pressure wherein a gas capable of forming a hydrate chemically reacts with water forming a complex molecular structure having properties which are different from those of the starting reactants. However, the complex molecular structure is usually capable of being easily converted back into the original simpler compounds, e.g., gas and water, having the original respective properties. To illustrate, under the conditions of temperature and pressure represented on the hydrate formation line of the phase diagram shown in FIG. 1, carbon dioxide, a colorless gas, forms a complex with water, a colorless liquid, and may be represented by the molecular formula, $CO_2 \cdot nH_2O$ where n equals 6–8 moles. The gas hydrate is a greyish-white solid which is insoluble in water.

Also used herein is the gas "condensation line" which is meant to represent the conditions of temperature and pressure wherein the gas used in the hydrate-forming reaction will condense or liquefy. An example of a gas condensation line is shown in FIG. 1 and is labeled "$CO_2$ condensation line."

In carrying out the process of this invention, the gasified ice product will preferably be prepared from water. Although some advantages in terms of reproducibility of precise conditions and stability of the final product may be obtained by using distilled or deionized water, the process of the present invention is not limited to these. The person of ordinary skill in the art may employ various types of solutions, and in the case of food products such as beverages, various materials including sugar, color, flavor, acidulents, and the like, knowing that they may decrease the ease of process control or affect the stability of the final product. Thus, the terms water and aqueous liquid will be hereinafter employed to include water containing added materials such as those mentioned as well as water per se.

Among the gases which are capable of forming conditionally-stable hydrates are those which form hydrates which appear to be characterized by a loose bond between the gas and water under the controlled conditions of temperature and high pressure. All of the suitable gases exist in the gaseous state at atmospheric pressure at temperatures above 0° C. For example, carbon dioxide gas combines with water to form a gas hydrate containing about 6 moles of water per mole of gas. The hydrates are further characterized by their ability to be stored in essentially stable condition at temperatures below about 0° C. and then be decomposed by melting in an aqueous liquid.

Specifically identified as gases capable of forming conditionally-stable hydrates are various oxides of non metals, typically nitrous oxide; sulfur-containing gases including hydrogen sulfide; chlorine containing gases, including chlorine and methylene chloride; various inert gases such as helium, argon, krypton, and neon; carbon monoxide, and carbon dioxide. Preferably, the gas will be selected from the group consisting of these, and most preferably will comprise carbon dioxide, nitrous oxide, or chlorine, due to their adaptability to the process and their wide-spread utilities. While not intending to be bound to these specific example of carbon dioxide, the present detailed description will focus on this as exemplary, due to its ready adaptability to use in preparing carbonated beverages for which there appears to be an immediate commercial opportunity.

BRIEF DESCRIPTION OF THE DRAWING

The present invention will be better understood and its advantages will become more apparent when the following detailed description is read in light of the accompanying drawings wherein:

FIG. 1 is a phase diagram showing the physical states of a reaction mixture containing carbon dioxide, water and $CO_2$ hydrate at temperatures between about $-13°$ C. and about 10° C. and pressures between 0 and 650 psig; and FIG. 2 is a graph showing the effect of carbonation pressure and reaction time on $CO_2$ content in carbonated ice prepared according to Example II.

BEST MODE FOR CARRYING OUT THE INVENTION

The present invention provides a gasified ice product characterized by a high gas content, prolonged storage stability of up to six months or longer and satisfactory for commercial distribution in its frozen state. The product also provides vigorous, uniform release of gas when placed in an aqueous liquid. The following description will discuss a preferred process where, in the preparation of carbonated ice, a high contact pressure between the carbon dioxide and the aqueous liquid is maintained to obtain hydrate formation, and the temperature of and the pressure on the resulting aqueous liquid containing the hydrate are carefully controlled to prevent decomposition of the hydrate or liquefaction of the gas, to provide the final solidified product.

In the initial stage in processing, a conditionally-stable-hydrate-forming gas such as carbon dioxide is contacted with an aqueous liquid under conditions of temperature and pressure capable of forming a stable gas hydrate. To achieve the hydrate complex, the temperature must be at or below that at which the gas hydrate decomposes at the existing pressure in the system. Reference to FIG. 1 shows a line carrying the legend "Hydrate Formation Line". For any given pressure, the temperature of contact must be on or below this line for hydrate to be formed and above the freezing temperature of the aqueous liquid. Should the temperature rise above the line at any given pressure, hydrate will begin to decompose, giving off gaseous carbon dioxide.

During the period of contact for hydrate formation according to the present invention, the pressure must be high for example greater than 350 psig to obtain the desired high gas content within a commercially practical period of time. Specifically, the gas pressure during the contact should be maintained at a value less than that at which the gas would liquefy at the existing temperature. Referring again to FIG. 1, there is shown a line with the legend "$CO_2$ Condensation Line". Any combination of temperature and pressure along or to the right hand side of this condensation line will result in the formation of liquid carbon dioxide. Thus, any pressure for $CO_2$ which is above about 350 psig would result in the formation of liquid $CO_2$ if the temperature of the aqueous liquid were dropped straight down at constant pressure to the final freezing conditions designated as point C on FIG. 1.

Thus, it would be seen from FIG. 1 that for carbon dioxide, the temperature and pressure during the periods of contact between the carbon dioxide and aqueous liquid for formation of the hydrate, cooling of the hydrate and freezing of the unreacted surrounding liquid must be maintained at various combinations within the phase diagram region which is shown to be between the Hydrate Formation Line and the $CO_2$ Condensation Line. Those skilled in the art will be aware that once the formation of hydrate begins at a given pressure, the temperature of the reaction mixture will tend to rise due to the evolution of the latent heat of formation of the hydrate. Thus, it is necessary to constantly provide heat exchange from the reaction medium to maintain the temperature at or below the Hydrate Formation Line.

While pressures of 350 psig can be employed with satisfactory results, it is preferred to employ a pressure during the contact at a level of from about 400 to about 650 psig. The reason for this is that the higher the pressure during contact, the less contact period is required.

While this is important in batch procedures, it takes on even greater significance when a continuous process, such as employing a scraped surface heat exchanger is employed. In continuous processes of this type, the residence time within the contact apparatus is extremely limited, typically being on the order of from about 2 to 4 minutes. A particularly preferred pressure range will be from about 450 to 600 psig. It can be seen from FIG. 1 that the equilibrium temperature for hydrate formation at these pressures is within the range of from about 7° C. to about 10° C.

The contact between the gas and the aqueous liquid are maintained for a period of time effective to form a gas hydrate suspended in the aqueous liquid. The exact time during which this hydrate will form to a practical level for suitable gasified ice products depends upon a number of factors including the pressure as described above, the concentration of solids within the aqueous liquid, the efficiency of heat exchange from the aqueous liquid, and the efficiency of contact between the gas and the aqueous liquid. Thus, there is no universal set of preferred contact times. Experience will show, however, as will be described in the examples later and is seen from FIG. 2, that a particular reaction scheme can be standardized to obtain a prediction of contact time to achieve a desired level of hydrate formation.

Because one of the objects of the invention is to prepare gasified ice products having high gas contents, the contact between the gas and the aqueous liquid should be maintained for a period of time sufficient to bring the hydration reaction to within at least 75% and preferably about 90% of completion. The point of near completion of the reaction is indicated where the temperature of the aqueous liquid begins to fall after maintaining a steady value during reaction due to the evolution and removal of heat. Once the reaction is complete, the evolution of the latent heat of hydrate formation will cease, and the heat exchange contact with the aqueous liquid will cause the temperature of the liquid to drop.

In the preferred embodiment where carbon dioxide is contacted with an aqueous liquid to form carbonated ice, the contact will preferably be maintained for a period of time effective to form sufficient hydrate to produce a product containing greater than 75, and preferably 85 to 110, milliliters of carbon dioxide per gram of product. While it is theoretically possible to achieve higher carbon dioxide contents, on the order of up to about 118-120 milliliters per gram of product, and these products are intended to be included within the scope of the invention, the most practical products will contain sufficient non-hydrated, $CO_2$-saturated water which can be frozen to form a continuous coating around dispersed hydrate complexes and thereby protect these hydrate complexes from decomposition during storage.

After the desired degree of hydration, the hydrate must be recovered as a dispersed phase within a continuous matrix of slightly carbonated ice. It is a prime feature of the present invention that the continuous phase is substantially free of large pockets of entrained carbon dioxide in either the free liquid or the free gaseous state resulting from either hydrate decomposition or $CO_2$ condensation during formation, cooling and freezing of the hydrate. This is a significant achievement in that high pressures, e.g., above 350 psig, are employed to effect a hydration reaction producing high carbon dioxide content per gram of ice which is substantially void of extraneous $CO_2$ gas in the product. The resulting gasified ice product has a substantially increased storage stability, typically about 6 months or more; is more uniform within a batch and between batches; and is a relatively "quiet", hard, non-popping ice which uniformly and evenly effervesces when immersed in an aqueous liquid. To achieve this result, the pressure of the reaction mixture must be carefully controlled and maintained below the condensation pressure of the gas while the temperature of the aqueous liquid containing the gas hydrate is reduced to produce final freezing of all the aqueous liquid. The temperature and pressure are controlled to maintain the temperature throughout the aqueous liquid below that at which hydrate would decompose at the existing pressure and to maintain the pressure below that at which the gas would liquefy at the existing temperature.

Reference to FIG. 1 will illustrate the importance of this control. If temperature of the aqueous liquid is decreased to the $CO_2$ condensation line at any pressure above about 350 psig, and especially if within the preferred range of 450 to 600 psig, gaseous carbon dioxide contained within the reaction system, both in the head space above the liquid level and/or physically entrained within any aqueous liquid present, will condense causing two undesirable phenomena. First, the overall pressure within the reaction vessel will undergo a significant decrease causing hydrate at or near the center of the reaction mass (which is at a warmer temperature than that at or near the walls of the vessel where it is in closer proximity to the cooling medium) to decompose. Second, liquid $CO_2$ bubbles will form within any aqueous liquid phase and become entrapped within the ultimately frozen product. This is disadvantageous from a product performance standpoint since liquid $CO_2$ expands rapidly at atmospheric pressure and will cause structural failure of the frozen ice product immediately or upon impact during shipment, and will cause a popping and splattering phenomenon when the product is melted in an aqueous liquid for use.

If, on the other hand, the pressure is reduced while the temperature is maintained, the hydrate will decompose, yielding gaseous $CO_2$ in similar fashion to the entrapment of carbon dioxide in the liquid state, the entrapped gaseous $CO_2$ will cause these noted failures. Summarizing this again, if the aqueous liquid is maintained at a combination of temperature and pressure indicated at (A) in FIG. 1 and is immediately brought to its freezing temperature of −12° C. before reducing the pressure, undesirable entrainment of liquid carbon dioxide will occur as well as the decomposition of portions of the warmer hydrate contained in the reaction vessel. If, on the other hand, the pressure is dropped to 250 psig, as described in the prior art, without controlling the temperature, a significant portion of hydrate will be destabilized and $CO_2$ gas will be distributed throughout aqueous liquid and entrained as gaseous $CO_2$ upon dropping the temperature down to the desired final freezing conditions. However, if, the temperature and pressure in all portions of the aqueous liquid are controlled to remain within the indicated region of the phase diagram at all times, as they are reduced to point C, a dramatically improved product is achieved.

The carbonated ice prepared in the above manner can be packaged in a suitable container such as a can or styrofoam cup. When packaged in containers of this type, the carbonated ice will provide a high degree of storage stability at temperatures within the range of from about −5° to −20° C. for time periods of in excess of 4 and usually in excess of 6 months.

Along with the carbonated ice, in the same package or in a separate adjoining package, there may be provided a composition for preparing a soft drink such as the kind which comprise a color, flavor, and edible acidulent, and a sweetener, all of these ingredients being present in amounts effective to provide the desired taste and eye appeal.

The following examples are presented for the purpose of further illustrating and explaining the present invention, and are not to be taken as limiting in any regard. Unless otherwise indicated, all parts and percentages are by weight.

EXAMPLE 1—Controlled Cooling and Freezing Carb-Ice

This example illustrates the preparation of a carbonated ice product according to the invention and employs the temperature and pressure control scheme during product solidification as shown in FIG. 1. 1,000 milliliters of deionized water at a temperature of 25° C. is placed in a Parr pressure reactor of 2 liter capacity. The vessel is closed, agitation started, and carbon dioxide is admitted thereto at a pressure of about 500 psig. The vessel is cooled by a constant temperature bath maintained at a temperature of slightly above 0° C. The carbon dioxide feed is adjusted to keep the pressure during the period of contact within the reactor at a pressure of 500 psig during the course of the hydration reaction. The contents of the reactor are maintained in constant agitation by a mechanical stirrer operated at about 1000 rpm. A temperature of about 8° C. is maintained throughout the course of the reaction which is continued for 60 minutes. After this period of time, agitation is stopped, the contents of the reactor are carefully brought to a temperature of −12° C. and a pressure of 250 psig according to the gradual step-by-step decrease shown in FIG. 1. This assures that the contents of the reaction system, at no time, deviate from within the temperature and pressure boundaries as shown in the phase diagram of FIG. 1. In particular, the reaction mixture is first cooled from 8° C. to 3° C. at constant pressure (500 psig); the reaction mixture is then decompressed from 500 psig to 320 psig at a constant temperature of 3° C.; then the mixture is cooled from 3° C. to 1° C. at constant pressure (320 psig); next the mixture is further decompressed from 320 psig to the desired 250 psig for final freezing while maintaining the temperature constant at 1° C.; and finally, the reaction mixture is cooled to its desired final freezing temperature of −12° C. at constant pressure (250 psig). The temperature is maintained at −12° C. for 3 hours in a 4-inch diameter vessel prior to opening the reactor and discharging the product. The resulting product is grey in appearance and has a carbon dioxide content of 75 milliliters per gram. This product, when placed in an aqueous solution comprising a commercial beverage mix sold under the registered Trademark Kool Aid, vigorously and evenly effervesces over a period of about 15 minutes during the entire time of which the beverage is well carbonated and cooled by the carbonated ice.

EXAMPLE 2—Preferred Pressures for Formation of Carb-Ice

The procedure of Example 1 is repeated but this time three additional pressures, 250 psig, 370 psig, and 600 psig, are employed during the course of reaction which is extended over varying times. The results of these tests in terms of carbon dioxide contents of the resulting products are shown in FIG. 2. Significantly, it can be seen that unless elevated pressures are employed, the hydration reaction takes unduly long periods of time and the same high levels of hydrate formation and carbon dioxide content cannot be achieved. Thus, the significance of the present invention in enabling the efficient preparation of carbonated ice having stability suitable for commercial distribution under elevated pressures while alleviating the problem of popping and cracking is seen to be significant.

EXAMPLES 3-4—Storage Stability of Carb-Ice

Samples of gasified ice products, also identified herein as "carb-ice," are prepared according to the procedure of Example 1 and analyzed at the various monthly time intervals shown in Table I below. Another sample of carb-ice, identified as "A" in Table I, is prepared at 500 psig, cooled and frozen under a constant pressure of 500 psig rather than with the required lowering of pressure described in this invention. There is a noticeable and dramatic decrease in $CO_2$ content of Sample A upon storage. Sample A was also observed to have spontaneous cracking and popping characteristics when removed from the pressurized reactor maintained at a temperature of about −12° C. and a pressure of about 250 psig; these undesirable explosive properties were not observed in Examples 3 and 4.

TABLE I

PERCENT OF $CO_2$ RETAINED
(Atmospheric Pressure, −12° C.)

| Example No. | Formation Pressure (psig) | Initial $CO_2$ Content (ml/gm) | % $CO_2$ Retained 4 mos. | 5 mos. | 6 mos. | Popping or Exploding Phenomenon |
|---|---|---|---|---|---|---|
| 3 | 500 | 87.4 | 100 | 100 | 97 | No |
| 4 | 500 | 93.5 | 100 | 100 | 93 | No |
| *A | 500 | 77.3 | 83 | 80 | 72 | Yes |

*Not an example of this invention, to be used for comparison purposes only.

Gasified ice products capable of effervescing in water to release gases such as carbon dioxide have heretofore had a reported shelf-life in frozen storage of about 33 days when prepared to contain high gas contents, e.g., 75 milliliters (ml) per gram (gm) and above. The above table shows that nonexplosive gasified ice products prepared according to this invention retain almost all of the initial carbon dioxide content after 4-6 months storage at atmospheric pressure and −12° C.

The above description is for the purpose of teaching the person skilled in the art how to practice the present invention. This description is not intended to detail all of the obvious modifications and variations of the invention which will become apparent to the skilled worker upon reading. However, applicants do intend to include all such obvious modifications and variations within the scope of their invention which is defined by the following claims.

We claim:

1. A process for preparing a gasified ice characterized by a high gas content, prolonged storage stability suitable for commercial distribution in its frozen state, and a vigorous, uniform effervescence when placed in water, which comprises:
    (a) contacting an aqueous liquid with a conditionally-stable, hydrate-forming gas under conditions of temperature and pressure capable of forming a chemical hydrate complex of the gas, said contacting temperature and pressure being on or below the hydrate formation line at a temperature above the freezing temperature of the aqueous liquid;

(b) maintaining said contact for a period of time effective to form a gas hydrate complex suspended in the aqueous liquid;

(c) controlling the reduction of the temperature of the aqueous liquid containing said gas hydrate complex and controlling the reduction of the pressure to maintain the pressure below that at which the gas would liquefy at the existing temperature and above that which is represented by the hydrate formation line, said control resulting in a stepwise reduction of temperature and pressure during the hydrate formation reaction;

(d) reducing the temperature of the aqueous liquid containing the gas hydrate complex of step (c) to produce final freezing of all the aqueous liquid; and thereby (e) entrapping the suspended gas hydrate complex in the frozen aqueous liquid.

2. A process according to claim 1 wherein the gas is selected from the group consisting of carbon dioxide, carbon monoxide, hydrogen sulfide, chlorine, methylene chloride, helium, argon, krypton, neon, and nitrous oxide.

3. A process according to claim 2 wherein the gas is carbon dioxide.

4. A process according to claim 3 wherein the pressure during contact is maintained at a level above 350 psig.

5. A process according to claim 4 wherein the pressure during contact is maintained at a level of from 400 to 650 psig.

6. A process according to claim 4 wherein the contact is maintained for a period of time effective to form sufficient hydrate to produce a product containing greater than 75 milliliters of carbon dioxide per gram of product.

7. A process according to claim 6 wherein the contact is maintained for a period of time effective to form sufficient hydrate to produce a product containing from 85 to 110 milliliters of carbon dioxide per gram of product.

8. A carbonated ice product prepared according to the process of claim 1.

9. A carbonated ice product according to claim 1 containing greater than 75 milliliters of carbon dioxide per gram of product and characterized by a prolonged storage stability suitable for commercial distribution in its frozen state and a vigorous, uniform effervescence when placed in aqueous liquid, which comprises: a solid suspension of a carbon dioxide hydrate complex within a continuous matrix of solid ice, the ice being substantially free of entrained carbon dioxide in either the free liquid or free gaseous states.

10. A carbonated ice product according to claim 9 containing from 85 to 110 milliliters of carbon dioxide per gram of product.

11. A carbonated ice product according to claim 10 containing greater than 90 milliliters of carbon dioxide per gram of product.

* * * * *